June 12, 1934.  G. A. BIGGS  1,962,382
HYDRAULIC TURBINE
Filed Dec. 15, 1932   3 Sheets-Sheet 1
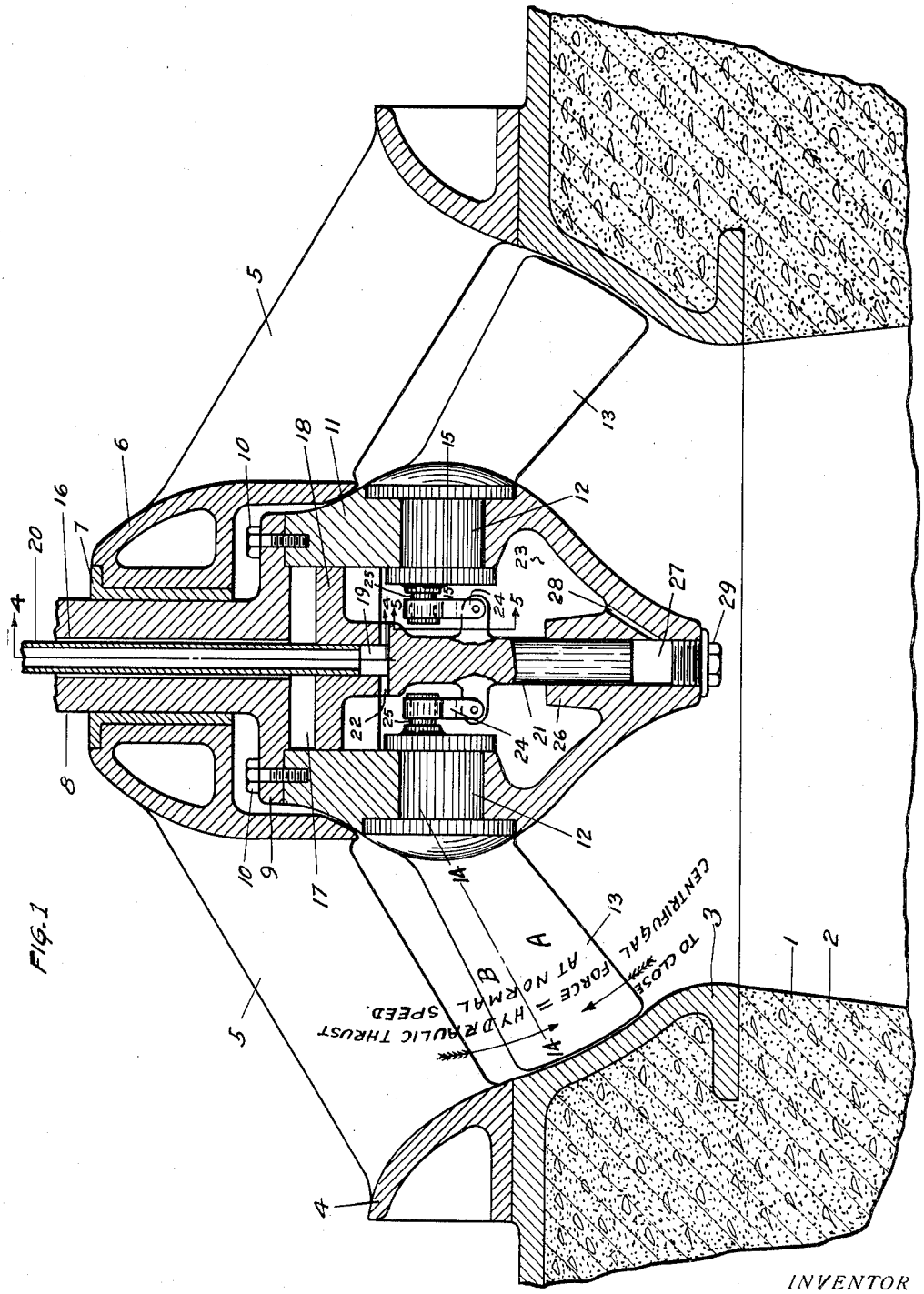
INVENTOR
GEORGE A. BIGGS.
BY
ATTORNEYS June 12, 1934.　　　　G. A. BIGGS　　　　1,962,382
HYDRAULIC TURBINE
Filed Dec. 15, 1932　　　3 Sheets-Sheet 2
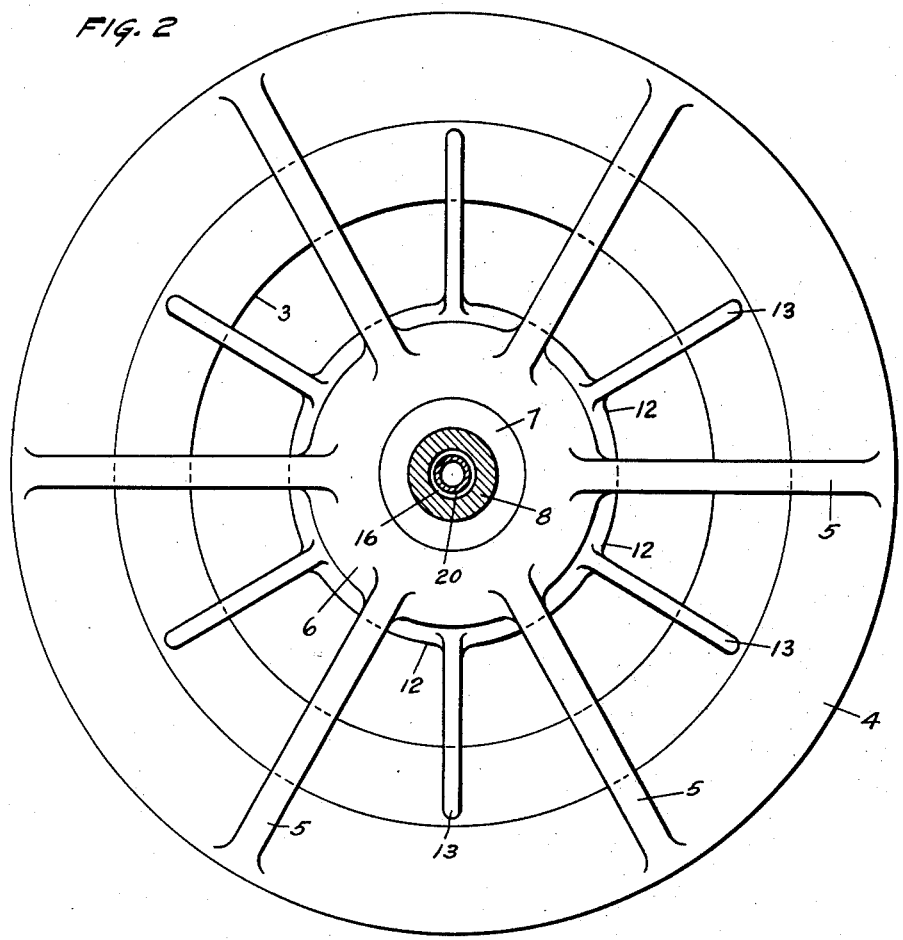
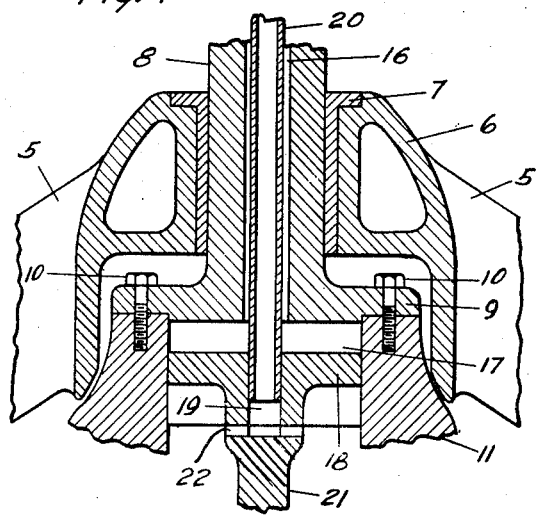
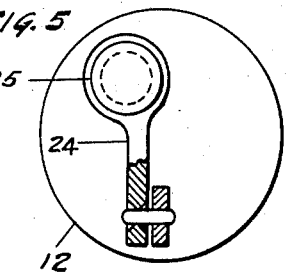
INVENTOR
GEORGE A. BIGGS.
BY
ATTORNEYS

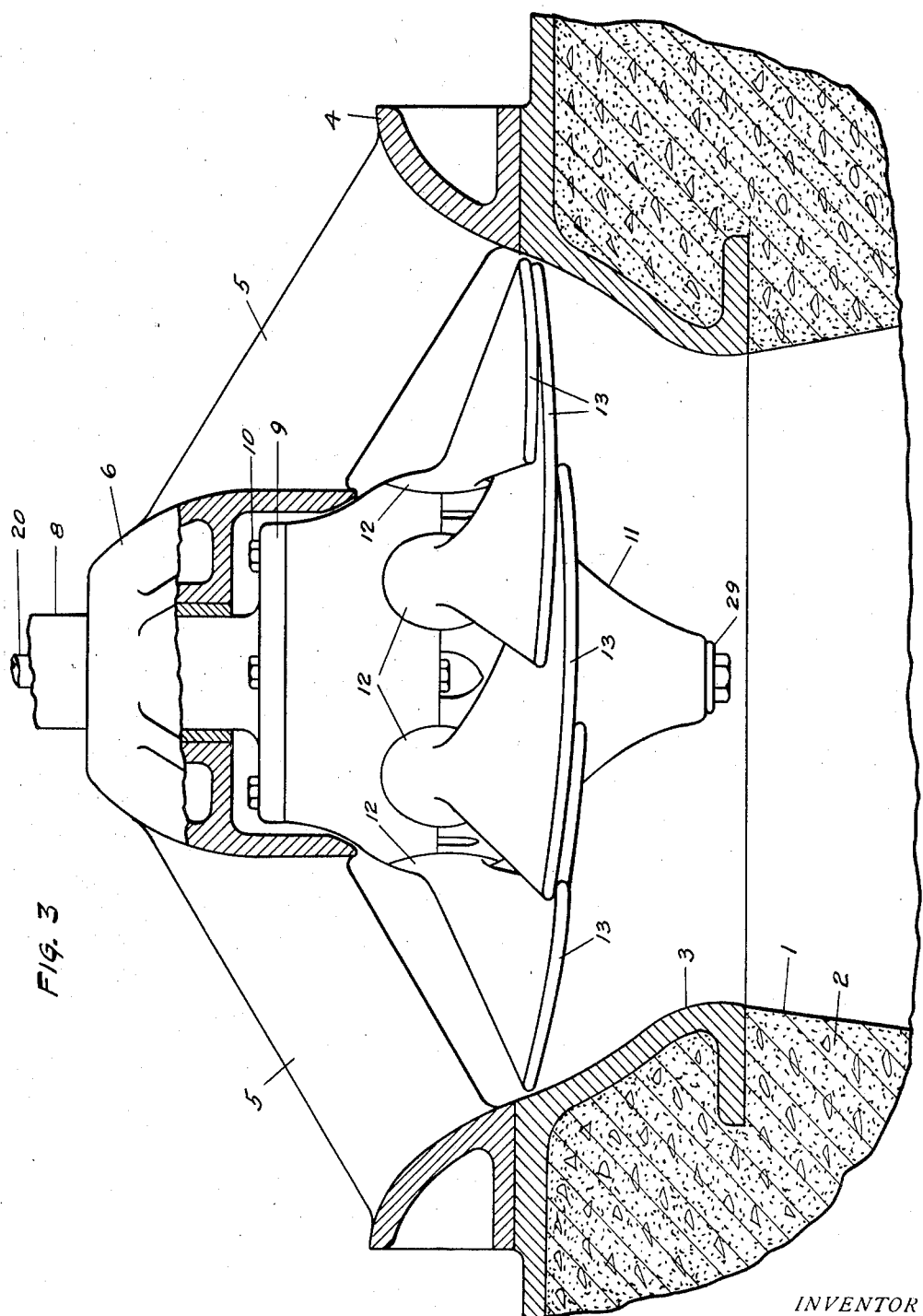

Patented June 12, 1934

1,962,382

UNITED STATES PATENT OFFICE 1,962,382

HYDRAULIC TURBINE

George A. Biggs, Springfield, Ohio, assignor to The James Leffel and Company, Springfield, Ohio, a corporation of Ohio Application December 15, 1932, Serial No. 647,352

26 Claims. (Cl. 253—144)

My invention relates to hydraulic turbines.

It is an object of my invention to provide a hydraulic turbine runner in which the turbine runner blades have a normal tendency to open being so balanced that the pressure acting on their surfaces tends to turn them open at speeds lower than normal.

It is an object to provide a runner in which the blades will continue to open until centrifugal force in the blades overcomes the hydraulic thrust, at which time, if the speed increases, the centrifugal force becomes greater than the hydraulic thrust, thereupon they will then close to a point where the two thrusts are balanced.

It is my object to provide blades which will then float between these opposing forces.

It is a further object to so arrange the blades so that pressure acting on the upper side of an adjusting piston for adjusting the blades, whether the pressure is liquid or air, may be utilized for closing the blades, but there will be a minimum amount of work to be done in view of the self adjusting or floating character of the blades, their design and mounting.

It is a further object to provide an adjustable runner bucket construction in which a weight or spring may be substituted for liquid or air for actuating the blades and, if desired, a liquid pressure or air pressure means may be used as an adjuster.

It is my object to provide a self adjusting runner in combination with fixed guide vanes and, in particular, runner buckets having horizontal hub axes and diagonal blade axes.

It is my object to provide in such a combination blades that are so designed that centrifugal force and hydraulic thrust at normal speed will tend to balance causing the blades to float.

Referring to the drawings:

Figure 1 is a vertical section through the runner hub, the draft tube, foundation ring, outer and inner gate rings;

Figure 2 is a top plan view of the mechanism shown in Figure 1;

Figure 3 is a side elevation of the runner with the buckets closed and with the draft tube in section showing the means by which the water flow is cut off entirely by the buckets;

Figure 4 is a section on the line 4—4 of Figure 1 looking in the direction of the arrows;

Figure 5 is a section on the line 5—5 of Figure 1 looking in the direction of the arrows.

Referring to the drawings in detail, 1 is a draft tube in the foundation 2 which is capped by a draft tube foundation ring 3. Mounted on this ring is the outer ring 4 supporting a plurality of guide vanes 5, the inner ends of which support an inner ring 6 carrying the bearing 7 that engages and aligns the turbine runner shaft 8. On this shaft is mounted a head 9 to which is bolted by the bolts 10 a runner hub 11. Mounted in this hub on horizontal axes are a plurality of hubs 12 carrying buckets or blades 13. The axis of each of these blades is indicated at 14—14 and is so arranged that the blades will have a natural tendency to rotate about their general axes 15—15 as well as the axes 14—14 and to move to their maximum open position. The pressure of the water passing over them will, therefore, tend to open them to this maximum position.

It will be noted that the axes 14—14 are diagonal extending outwardly and downwardly with respect to the horizontal axes 15—15. These unbalanced blades will tend to open at all speeds lower than the normal speed. They will continue to open until centrifugal force in the blades, due to the runner speed, overcomes the hydraulic thrust that tends to open them. Then, if the speed increases, the centrifugal force becomes greater than the hydraulic thrust and will tend to close the blades. These two forces opposing one another will result in the blades "floating" between these opposing forces in some intermediate partially open position depending upon the relative strength of the two forces.

With this floating or balanced blade condition, I provide a blade actuating mechanism for regulating the position of the blades and particularly for closing them. The work of so regulating the blades is reduced to the minimum by reason of their balance between the hydraulic pressure and centrifugal force.

Adjusting mechanism

This adjusting mechanism consists of a hollow turbine runner shaft 8 having a passageway 16 therein which communicates with the pressure chamber 17 constituting a cylinder in which cylinder the piston 18 reciprocates. This piston has a central passageway 19 for receiving the end of a pipe 20 which extends upwardly through the passageway 16 in the runner shaft 8 and communicates with the return side of a pump while the passageway 16 communicates with the outlet side of a pump.

The piston 18 is provided with a piston rod 21 having lateral ports 22 communicating with the chamber 23 within the hub 11. This chamber 23 through the ports 22 communicates with the interior of the pipe 20. The piston rod is provided with a plurality of actuating links 24 which engage with the stub shafts 25 eccentrically located on the hub bearings 12 of each blade. Thus, the movement of the piston rod 21 will simultaneously and equally actuate each one of the blades 13. The lower end of the piston rod is guided by a bearing 26 formed in the bottom of the hub 11. In this tubular chamber 27 formed by the bearing 26 is formed a port 28 communciating with the interior of the hub 23 to prevent liquid or air binding between the end of the piston rod 21 and the plug 29 closing the passageway 27 in the bearing 26.

*Operation*

The water passing over the blades due to the fact that each blade 13 has a greater area A towards the trailing edge of the bucket with respect to the axes 14—14 than the area B, will tend to open the bucket and keep it open with respect to its adjacent blades or buckets.

Such opening takes place under hydraulic thrust below normal speeds but, as the runner increases its speed due to the action of the water on the wide open buckets centrifugal force tends to thrust the buckets upwardly into a plane at right angles to the axis of the runner. Due to the eccentric character of the buckets, this results in a tendency to rotate the buckets or blades 13 to closed position. These two forces balance each other at normal speed. To unbalance them I provide the adjusting mechanism heretofore described which may consist of pressure acting on the upper side of the piston 18. Either liquid or air may be used for closing the blades. The liquid pressure can be used as an auxiliary adjusting means to a weighted or spring construction.

By employing blades that close and therefore shut off the flow of water entirely or blades that can be closed by the adjusting mechanism I can adjust without the use of movable gates the flow of water through the turbine and can regulate that flow to maintain a constant speed irrespective of the supply of water in the head waters.

It will be understood that I desire to comprehend within my invention such modifications as may be necessary to adapt it to varying conditions and uses.

The instant application is distinguished from George A. Biggs application, Serial No. 647,358, filed December 15, 1932, by the fact that the instant invention has a relatively large area of unequal size from hub to periphery on the trailing edge while application of George A. Biggs, Ser. No. 647,358 has a constant area on the trailing edge between that edge and the center line of the blade. The present case is distinguished from application of George A. Biggs, Ser. No. 618,489, by the fact that, in the instant application, the trailing edge and leading edge are straight and the area on one side of the center line of the blade is constant from periphery to hub, whereas in application of George A. Biggs, Serial No. 618,489, the areas on both sides of the center line are varying areas having the trailing edge and leading edge of the buckets in application Serial No. 618,489 are not straight.

Having thus fully described my invention, what I claim as new and desire to secure by letters patent, is:

1. In a hydraulic turbine, a runner comprising a shaft and hub and self adjusting unbalanced buckets said buckets comprising horizontally disposed axles and diagonally disposed blades having their leading and trailing edges straight.

2. In a hydraulic turbine, a runner comprising a shaft and hub and self adjusting unbalanced buckets so arranged as to open under the influence of hydraulic pressure said buckets comprising horizontally disposed axles and diagonally disposed blades having their leading and trailing edges straight.

3. In a hydraulic turbine, a runner comprising a shaft and hub and self adjusting unbalanced buckets so arranged as to open under the influence of hydraulic pressure and to close under the influence of centrifugal force said buckets comprising horizontally disposed axles and diagonally disposed blades having their leading and trailing edges straight.

4. In a hydraulic turbine, a runner comprising a shaft and hub and self adjusting unbalanced buckets so arranged as to open under the influence of hydraulic pressure and to close under the influence of centrifugal force, said buckets being arranged that at normal speed the hydraulic thrust of the water passing over them and the centrifugal force applied to them by the rotation of the runner will balance said buckets comprising horizontally disposed axles and diagonally disposed blades having their leading and trailing edges straight.

5. In a hydraulic turbine, a runner comprising a shaft and hub and self adjusting unbalanced buckets so arranged as to open under the influence of hydraulic pressure and to close under the influence of centrifugal force, said buckets being arranged that at normal speed the hydraulic thrust of the water passing over them and the centrifugal force applied to them by the rotation of the runner will balance, and means to move said buckets out of balance controllable by an operator said buckets comprising horizontally disposed axles and diagonally disposed blades having their leading and trailing edges straight.

6. In combination in a hydraulic turbine runner shaft, a shaft, a hub, a plurality of rotatably mounted buckets diagonally disposed with respect to a horizontal axis at right angles to the major axis of the runner, said buckets being so arranged that they will tend to close under the influence of centrifugal force said buckets having their leading and trailing edges straight.

7. In combination in a hydraulic turbine runner shaft, a shaft, a hub, a plurality of rotatably mounted buckets diagonally disposed with respect to a horizontal axis at right angles to the major axis of the runner, said buckets being so arranged that they will tend to close under the influence of centrifugal force, and means controllable by an operator for adjusting said buckets against said centrifugal force said buckets having their leading and trailing edges straight.

8. In combination in a hydraulic turbine runner shaft, a shaft, a hub, a plurality of rotatably mounted buckets diagonally disposed with respect to a horizontal axis at right angles to the major axis of the runner, said buckets being so arranged that they will tend to close under the influence of centrifugal force, and a plurality of stationary guide vanes arranged to receive and direct axial flow of water over said buckets said buckets having their leading and trailing edges straight.

9. In combination in a hydraluic turbine runner shaft, a shaft, a hub, a plurality of rotatably mounted buckets diagonally disposed with respect to a horizontal axis at right angles to the major axis of the runner, said buckets being so arranged that they will tend to close under the influence of centrifugal force, means controllable by an operator for adjusting said buckets against said centrifugal force, and a plurality of stationary guide vanes arranged to receive and direct axial flow of water over said buckets said buckets having their leading and and trailing edges straight.

10. In combination, a hydraulic turbine runner comprising a shaft, a hub, a plurality of rotatable, diagonally disposed blades having a greater area with respect to their axes of rotation towards their trailing edges than their leading edges said blades having their leading and trailing edges straight whereby the centrifugal force on the blades and the hydraulic thrust on the relative areas of the blades will counterbalance one another to maintain the blades in normally operative position.

11. In combination, a hydraulic turbine runner comprising a shaft, a hub, a plurality of rotatable, diagonally disposed blades having a greater area with respect to their axes of rotation towards their trailing edges than their leading edges, and means for causing the rotation of said buckets said blades having their leading and trailing edges straight whereby the centrifugal force on the blades and the hydraulic thrust on the relative areas of the blades will counterbalance one another to maintain the blades in normally operative position.

12. In combination, a hydraulic turbine runner comprising a shaft, a hub, a plurality of rotatable, diagonally disposed blades having a greater area with respect to their axes of rotation towards their trailing edges than their leading edges, means for causing the rotation of said buckets, comprising a liquid cylinder, piston and interconnecting means to each of said buckets said blades having their leading and trailing edges straight whereby the centrifugal force on the blades and the hydraulic thrust on the relative areas of the blades will counterbalance one another to maintain the blades in normally operative position.

13. In combination, a hydraulic turbine runner comprising a shaft, a hub, a plurality of rotatable, diagonally disposed blades having a greater area with respect to their axes of rotation towards their trailing edges than their leading edges, means for causing the rotation of said buckets, comprising a liquid cylinder, piston and interconnecting means to each of said buckets, and means of supplying liquid to said piston through the runner shaft and withdrawing liquid from behind the piston through the runner shaft said blades having their leading and trailing edges straight whereby the centrifugal force on the blades and the hydraulic thrust on the relative areas of the blades will counterbalance one another to maintain the blades in normally operative position.

14. In combination, a hydraulic turbine runner comprising a shaft, a hub, a plurality of rotatable, diagonally disposed blades having a greater area with respect to their axes of rotation towards their trailing edges than their leading edges, and a plurality of superimposed guide vanes having axes parallel to the diagonal axes of the runner blades said blades having their leading and trailing edges whereby the centrifugal force on the blades and the hydraulic thrust on the relative areas of the blades will counterbalance one another to maintain the blades in normally operative position.

15. In combination, a hydraulic turbine runner comprising a shaft, a hub, a plurality of rotatable, diagonally disposed blades having a greater area with respect to their axes of rotation towards their trailing edges than their leading edges, means for causing the rotation of said buckets, and a plurality of superimposed guide vanes having axes parallel to the diagonal axes of the runner blades said blades having their leading and trailing edges straight whereby the centrifugal force on the blades and the hydraulic thrust on the relative areas of the blades will counterbalance one another to maintain the blades in normally operative position.

16. In combination, a hydraulic turbine runner comprising a shaft, a hub, a plurality of rotatable, diagonally disposed blades having a greater area with respect to their axes of rotation towards their trailing edges than their leading edges, means for causing the rotation of said buckets, comprising a liquid cylinder, piston and interconnecting means to each of said buckets, and a plurality of superimposed guide vanes having axes parallel to the diagonal axes of the runner blades said blades having their leading and trailing edges straight whereby the centrifugal force on the blades and the hydraulic thrust on the relative areas of the blades will counterbalance one another to maintain the blades in normally operative position.

17. In combination, a hydraulic turbine runner comprising a shaft, a hub, a plurality of rotatable, diagonally disposed blades having a greater area with respect to their axes of rotation towards their trailing edges than their leading edges, means for causing the rotation of said buckets, comprising a liquid cylinder, piston and interconnecting means to each of said buckets, means of supplying liquid to said piston through the runner shaft and withdrawing liquid from behind the piston through the runner shaft, and a plurality of superimposed guide vanes having axes parallel to the diagonal axes of the runner blades said blades having their leading and trailing edges straight whereby the centrifugal force on the blades and the hydraulic thrust on the relative areas of the blades will counterbalance one another to maintain the blades in normally operative position.

18. In combination, a draft tube, a foundation ring, an outer gate ring mounted thereon, a plurality of diagonally disposed stationary gates, an inner gate ring, a bearing therein for guiding a runner shaft, a runner shaft passing therethrough, a hub depending therefrom, a plurality of diagonally disposed buckets pivoted on said hub adapted to open under hydraulic thrust and to close under centrifugal force, and fluid means remote from said buckets adapted to modify the adjustment thereof by centrifugal force and hydraulic thrust, said buckets having their leading and trailing edges straight.

19. In combination, a draft tube, a foundation ring, an outer gate ring mounted thereon, a plurality of diagonally disposed stationary gates, an inner gate ring, a bearing therein for guiding a runner shaft, a runner shaft passing therethrough, a hub depending therefrom, a plurality of diagonally disposed buckets pivoted on said hub adapted to open under hydraulic thrust and to close under centrifugal force, means remote from said buckets adapted to modify the adjustment thereof by centrifugal force and hydraulic thrust, said inner gate ring having an inwardly and downwardly converging surface and said hub having its upper end within said inner gate ring and its exposed surface continuing downwardly and inwardly through blades mounted thereon and thereafter downwardly converging to a point said buckets having their leading and trailing edges straight.

20. In combination, a draft tube, a foundation ring, an outer gate ring mounted thereon, a plurality of diagonally disposed stationary gates, an inner gate ring, a bearing therein for guiding a runner shaft, a runner shaft passing therethrough, a hub depending therefrom, a plurality of diagonally disposed buckets pivoted on said hub adapted to open under hydraulic thrust and to close under centrifugal force, means remote from said buckets adapted to modify the adjustment thereof by centrifugal force and hydraulic thrust, said inner gate ring having an inwardly and downwardly converging surface and said hub having its upper end within said inner gate ring and its exposed surface continuing downwardly and inwardly through blades mounted thereon and thereafter downwardly converging to a point, said draft tube below said blades diverging downwardly and outwardly said buckets having their leading and trailing edges straight.

21. In combination in a hydraulic turbine runner comprising a shaft, a hub, a plurality of horizontally disposed journals for blades, a plurality of blades mounted thereon having axes diagonal thereof and closer to the leading edges than to the trailing edges of the blades said blades having their leading and trailing edges straight.

22. In combination in a hydraulic turbine runner comprising a shaft, a hub, a plurality of horizontally disposed journals for blades, a plurality of blades mounted thereon having axes diagonal thereof and closer to the leading edges than to the trailing edges of the blades, and means within said hub for actuating said blades to rotate them to various positions, said blades having their leading and trailing edges straight.

23. In combination in a hydraulic turbine runner comprising a shaft, a hub, a plurality of horizontally disposed journals for blades, a plurality of blades mounted thereon having axes diagonal thereof and closer to the leading edges than to the trailing edges of the blades, means within said hub for actuating said blades to rotate them to various positions, said means comprising a pressure means supplied remotely from said hub said blades having their leading and trailing edges straight.

24. In combination in a hydraulic turbine runner comprising a shaft, a hub, a plurality of horizontally disposed journals for blades, a plurality of blades mounted thereon having axes diagonal thereof and closer to the leading edges than to the trailing edges of the blades, means within said hub for actuating said blades to rotate them to various positions, said means comprising a pressure means supplied remotely from said hub embracing a piston, one side of which has pressure applied to it through a passageway through the turbine runner shaft and the other side of which has pressure removed therefrom by a pipe passing through the passageway and the runner shaft, a piston rod connected to said piston connected eccentrically to the journals of said blades to rotate them; said blades having their leading and trailing edges straight.

25. In an axial flow hydraulic turbine without gates, a plurality of stationary guide vanes, a runner comprising a hub, a plurality of adjustable buckets, the axles of which are horizontally disposed in said hub and the blades of which are diagonally disposed with respect to said axles, said blades having straight leading and trailing edges and having their areas with respect to the center lines of the blades so arranged as to be of different area, one of said areas being constant from periphery to hub and the other of said areas being constantly and progressively less from periphery to hub, whereby said buckets will tend to be maintained in their normal position by the opposing hydraulic and centrifugal forces imparted to them; and means to displace said buckets from their normal position.

26. In an axial flow hydraulic turbine without gates, a plurality of stationary guide vanes, a runner comprising a hub, a plurality of adjustable buckets, the axles of which are horizontally disposed in said hub and the blades of which are diagonally disposed with respect to said axles, said blades having straight leading and trailing edges and having their areas with respect to the center lines of the blades so arranged as to be of different area, one of said areas being constant from periphery to hub and the other of said areas being constantly and progressively less from periphery to hub, whereby said buckets will tend to be maintained in their normal position by the opposing hydraulic and centrifugal forces imparted to them; and means to displace said buckets from their normal position, said buckets being so arranged that they overlap and completely fill the draft tube in their closed position to prevent the flow of water therethrough.

GEORGE A. BIGGS.